(12) United States Patent
Fujiune et al.

(10) Patent No.: US 6,396,779 B1
(45) Date of Patent: May 28, 2002

(54) OPTICAL DISK APPARATUS HAVING TRACKING CONTROL FOR POSITIONING A LIGHT BEAM ALONG A TRACK ON AN OPTICAL DISK

(75) Inventors: Kenji Fujiune, Osaka; Mitsurou Moriya, Nara; Yoshihiro Kanda; Yuuichi Kuze, both of Osaka, all of (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 0 days.

(21) Appl. No.: 09/417,184

(22) Filed: Oct. 12, 1999

(30) Foreign Application Priority Data

Oct. 14, 1998 (JP) .......................................... 10-291684

(51) Int. Cl.[7] ................................................ G11B 7/00
(52) U.S. Cl. .................................. 369/44.32; 369/53.14
(58) Field of Search ........................... 369/44.27, 44.29, 369/44.32, 44.35, 53.14, 53.33, 44.28, 47.14, 47.44, 47.45, 53.3, 53.42

(56) References Cited

U.S. PATENT DOCUMENTS 5,559,768 A * 9/1996 Ito et al. ............... 369/44.35 X

FOREIGN PATENT DOCUMENTS

JP 52-80802 7/1977
JP 7-98877 4/1995

* cited by examiner

Primary Examiner—Paul W. Huber
(74) Attorney, Agent, or Firm—Ratner & Prestia

(57) ABSTRACT

An apparatus of the present invention is an optical disk apparatus for irradiating a track on an information carrier on which information is recorded with a light beam so as to reproduce information from the track. The optical disk apparatus includes: a tracking error detector for detecting a tracking error signal representing a displacement between the light beam and the track; a fine movement section for moving the light beam in a substantially radial direction of the information carrier; a coarse movement section for moving the fine movement section in the substantially radial direction of the information carrier; a tracking controller for controlling the fine movement section and the coarse movement section based on the tracking error signal detected by the tracking error detector so that the light beam is positioned along the track; and an eccentricity detector for detecting an amount of eccentricity of the track on the information carrier. The tracking controller controls the coarse movement section based on the amount of eccentricity detected by the eccentricity detector.

16 Claims, 10 Drawing Sheets

OPTICAL DISK APPARATUS HAVING TRACKING CONTROL FOR POSITIONING A LIGHT BEAM ALONG A TRACK ON AN OPTICAL DISK

BACKGROUND OF THE INVENTION

1. Field of the Invention

The present invention relates to an apparatus for focusing a light beam from a light source such as a semiconductor laser onto a rotating disk-shaped recording medium (hereinafter, referred to as an "optical disk") so as to record/reproduce signals on/from the optical disk. More particularly, the present invention relates to a tracking control for positioning the light beam along a track on the optical disk.

2. Description of the Related Art

With a conventional optical disk apparatus, a signal is reproduced from an optical disk by irradiating the optical disk with a light beam of a relatively small but constant light amount so as to detect the reflected light from the optical disk whose intensity has been modulated by the optical disk. A signal is recorded on the optical disk by writing information on a recording material film of the optical disk with a light beam while modulating the intensity thereof according to the signal to be recorded (e.g., Japanese Laid-Open Publication No. 52-80802).

A read-only optical disk is produced by recording a plurality of information pits on the disk in a spiral pattern. A recordable/reproducible optical disk is produced by providing an optically recordable/reproducible material film through a process such as vapor deposition on a surface of a substrate which includes spiral concave/convex tracks thereon.

To properly record information on an optical disk or reproduce the recorded information from the optical disk requires a focusing control and a tracking control. The focusing control is for controlling the optical disk in a direction normal to the optical disk surface (hereinafter, referred to as the "focusing direction") so that the light beam is always in a predetermined focused state at the recording material film. The tracking control is for controlling the optical disk in a radial direction of the optical disk (hereinafter, referred to as the "tracking direction") so that the light beam is always positioned along a predetermined track.

A conventional tracking control for an optical disk will be described with reference to FIG. 8. A disk-shaped optical disk 1 is rotated by a disk motor 50. An optical head 10 includes a semiconductor laser 11, a coupling lens 12, a polarization beam splitter 13, a ¼ wave plate 14, a focusing actuator 16, a tracking actuator 17, a detection lens 18, a cylindrical lens 19 and a 4-divided photodetector 20.

The optical head 10 can be traversed by a traverse motor 43 in the tracking direction. A light beam generated from the semiconductor laser 11 is collimated by the coupling lens 12, passes through the polarization beam splitter 13 and the ¼ wave plate 14, and is then focused by a focusing lens 15 on the optical disk 1.

The light beam is reflected by the optical disk 1, passes through the focusing lens 15 and the ¼ wave plate 14, and is then reflected by the polarization beam splitter 13. Thereafter, the reflected light passes through the detection lens 18 and the cylindrical lens 19 so as to be incident upon the 4-divided photodetector 20.

The focusing lens 15 is supported by an elastic body (not shown). The focusing lens 15 is moved in the focusing direction by applying a current to the focusing actuator 16 and in the tracking direction by applying a current to the tracking actuator 17.

The photodetector 20 detects a light amount signal and sends the detected light amount signal to a focusing error detector (hereinafter, referred to as the "FE generator") 30 and to a tracking error detector (hereinafter, referred to as the "TE generator") 40.

Using the light amount signal from the photodetector 20, the FE generator 30 calculates an error signal (hereinafter, referred to as an "FE signal") which indicates the focused state of the light beam at the information surface of the optical disk 1, and sends the FE signal to the focusing actuator 16 via a focusing linear filter (hereinafter, referred to as the "Fc linear filter") 31. The focusing actuator 16 controls the focusing lens 15 in the focusing direction so that the light beam is focused on the recording surface of the optical disk 1 in a predetermined state. Thus, the focusing control is performed.

Using the light amount signal from the photodetector 20, the TE generator 40 also calculates an error signal (hereinafter, referred to as a "TE signal") which indicates the positional relationship between the light beam and an intended track on the optical disk 1, and sends the TE signal to the tracking actuator 17 via a tracking linear filter (hereinafter, referred to as the "Tk linear filter") 41.

The tracking actuator 17 controls the focusing lens 15 in the tracking direction so that the light beam properly follows a track. The tracks of the optical disk 1 exist over a large area of the optical disk 1, extending from the inner periphery to the outer periphery of the optical disk 1. Therefore, the focusing lens 15 needs to be movable over a large extent in order to irradiate the intended track with the light beam.

Since the motion range of the tracking actuator 17 is limited, the optical head 10 needs to be driven in the tracking direction. Therefore, a drive signal output from the Tk linear filter 41 to the tracking actuator 17 is sent to the traverse motor 43 via a traverse linear filter 42, an average calculator 45 and a pulse generator 44 so as to move the optical head 10 in the tracking direction through the rotation of the traverse motor 43.

Thus, the optical head 10 moves in the tracking direction so that the drive signal to the tracking actuator 17 approaches zero or, in other words, so that the focusing lens 15 takes a normal position with respect to the optical head 10. By the two devices, i.e., the tracking actuator 17 and the traverse motor 43, operating as described above, the light beam follows a track on the optical disk 1. Thus, the tracking control is performed.

Typically, as compared with the tracking actuator 17, the traverse motor 43 is only responsive to an input signal having a relatively low frequency. The traverse linear filter 42 extracts a low-band component of the signal from the Tk linear filter 41, for which the traverse motor 43 can sufficiently follow the track, through a low-pass filter having a low-pass characteristic as illustrated in FIG. 9. Thus, the traverse motor 43 is driven by the extracted low-band component.

To move the optical head 10 by the traverse motor 43 requires a driving force which overcomes the frictional force of the traverse motor 43 itself or the frictional force of a mechanism for traversing the optical head 10.

Moreover, when the optical disk 1 has some eccentricity, the drive signal from the Tk linear filter 41 includes eccentricity components so that the light beam can properly follow the track. When the optical disk 1 rotates at a high speed, it is difficult for the traverse motor 43 to follow the eccentricity components of the drive signal. Therefore, it is necessary to drive the traverse motor 43 to eliminate an influence of the eccentricity.

In an optical disk apparatus 800 illustrated in FIG. 8, a signal from the traverse linear filter 42 is sent to the traverse motor 43 via the average calculator 45 and the pulse generator 44.

An operation of the optical disk apparatus 800 will be described with reference to FIGS. 10A to 10D. FIG. 10A illustrates a signal from the disk motor 50, FIG. 10B illustrates a signal from the traverse linear filter 42, FIG. 10C illustrates a signal from the average calculator 45, an FIG. 10D illustrates a signal from the pulse generator 44.

Referring to FIG. 10A, the disk motor 50 outputs one cycle of a square wave signal (hereinafter, referred to as the "FG signal") for each revolution thereof. Referring to FIG. 10C, the average calculator 45 calculates the average value of the signal output from the traverse linear filter 42 during a time period from the rising edge t1 to the rising edge t2 of the FG signal, and outputs the average value for the next time period from the rising edge t2 to the rising edge t3.

Since the average value is calculated for each revolution of the optical disk 1, the signal from the average calculator 45 is not influenced by the eccentricity of the optical disk 1. Referring to FIG. 10D, the pulse generator 44 outputs a pulse signal having a wave height and a pulse width which are respectively predetermined to be sufficient for driving the traverse motor 43, when the signal from the average calculator 45 exceeds a predetermined level SL (see FIG. 10C) (e.g., Japanese Laid-Open Publication No. 7-98877).

In the above-described conventional tracking control, the pulse width and the wave height of the drive signal to the traverse motor 43 are both fixed values. Therefore, as the frictional force of the traverse motor 43 itself or the frictional force of the mechanism for traversing the optical head 10 increase over time, the driving force of the traverse motor 43 may not overcome such frictional forces.

Moreover, since the average value is calculated for each revolution of the disk motor 50, the response speed of the traverse motor 43 is determined by the number of revolutions of the disk motor 50. Thus, the response speed of the traverse motor 43 decreases as the number of revolutions of the disk motor 50 decreases.

SUMMARY OF THE INVENTION

According to one aspect of this invention, there is provided an optical disk apparatus for irradiating a track on an information carrier on which information is recorded with a light beam so as to reproduce information from the track. The optical disk apparatus includes: a tracking error detector for detecting a tracking error signal representing a displacement between the light beam and the track; a fine movement section for moving the light beam in a substantially radial direction of the information carrier; a coarse movement section for moving the fine movement section in the substantially radial direction of the information carrier; a tracking controller for controlling the fine movement section and the coarse movement section based on the tracking error signal detected by the tracking error detector so that the light beam is positioned along the track; and an eccentricity detector for detecting an amount of eccentricity of the track on the information carrier. The tracking controller controls the coarse movement section based on the amount of eccentricity detected by the eccentricity detector.

In one embodiment of the invention, the eccentricity detector detects the amount of eccentricity based on an output of the tracking controller.

In one embodiment of the invention, the tracking controller includes: a fine tracking controller for controlling the fine movement section based on the tracking error signal so that the light beam is positioned along the track; and a coarse tracking controller for controlling the coarse movement section so that an amount of movement of the fine movement section by the fine tracking controller is zero on average.

In one embodiment of the invention, the eccentricity detector detects the amount of eccentricity based on an output of the coarse tracking controller.

In one embodiment of the invention, the eccentricity detector detects the amount of eccentricity based on an amplitude of an alternating current component of a control signal which is used by the coarse tracking controller for controlling the coarse movement section.

In one embodiment of the invention, the coarse tracking controller includes: a traverse linear filter for outputting a first drive signal for driving the coarse movement section based on an output of the fine tracking controller; and a traverse drive generator for outputting a second drive signal for driving the coarse movement section based on the first drive signal output from the traverse linear filter and based on the amount of eccentricity detected by the eccentricity detector. The eccentricity detector detects the amount of eccentricity based on the first drive signal output from the traverse linear filter.

In one embodiment of the invention, the tracking controller includes a switch for inactivating a control of the coarse movement section. The eccentricity detector detects the amount of eccentricity while inactivating the control of the coarse movement section by the switch during an operation of the tracking controller.

In one embodiment of the invention, the eccentricity detector detects the amount of eccentricity based on an output from the fine tracking controller.

In one embodiment of the invention, the eccentricity detector detects the amount of eccentricity based on an amplitude of an alternating current component of a control signal which is used by the fine tracking controller for controlling the fine movement section.

In one embodiment of the invention, the fine tracking controller includes a tracking linear filter for outputting a control signal for controlling the fine movement section. The eccentricity detector detects the amount of eccentricity based on an amplitude of an alternating current component of the control signal which is output from the tracking linear filter.

In one embodiment of the invention, the eccentricity detector detects the amount of eccentricity based on an output of the tracking error detector.

In one embodiment of the invention, the eccentricity detector detects the amount of eccentricity based on an amplitude of an alternating current component of the output of the tracking error detector.

In one embodiment of the invention, the coarse tracking controller includes: a traverse linear filter for outputting a first drive signal for driving the coarse movement section based on an output of the fine tracking controller: and a traverse drive generator for outputting a second drive signal for driving the coarse movement section based on the first drive signal output from the traverse linear filter and based on the amount of eccentricity detected by the eccentricity detector.

In one embodiment of the invention, the fine tracking controller includes a tracking linear filter for outputting a control signal for controlling the fine movement section.

In one embodiment of the invention, the eccentricity detector includes a dead zone width calculator for calculating a dead zone width representing a range in which a value of a drive signal for driving the coarse movement section is substantially zero, based on the amount of eccentricity. The tracking controller controls the coarse movement section based on the dead zone width calculated by the dead zone width calculator.

In one embodiment of the invention, the eccentricity detector includes an offset calculator for calculating a drive offset to be added to a drive signal for driving the coarse movement section based on the amount of eccentricity. The tracking controller controls the coarse movement section based on the drive offset calculated by the offset calculator.

Thus, the invention described herein makes possible the advantages of: (1) providing an optical disk apparatus capable of driving a traverse motor even when the frictional force of the traverse motor itself or the frictional force of the mechanism for traversing the optical head increases over time; and (2) providing an optical disk apparatus where the traverse motor has a desirable response speed even when the number of revolutions of the disk motor is small.

These and other advantages of the present invention will become apparent to those skilled in the art upon reading and understanding the following detailed description with reference to the accompanying figures.

BRIEF DESCRIPTION OF THE DRAWINGS

FIG. 7B illustrates an output signal from a Min detector:

DESCRIPTION OF THE PREFERRED EMBODIMENTS

Various examples of the present invention will now be described.

Example 1

Figure 1:
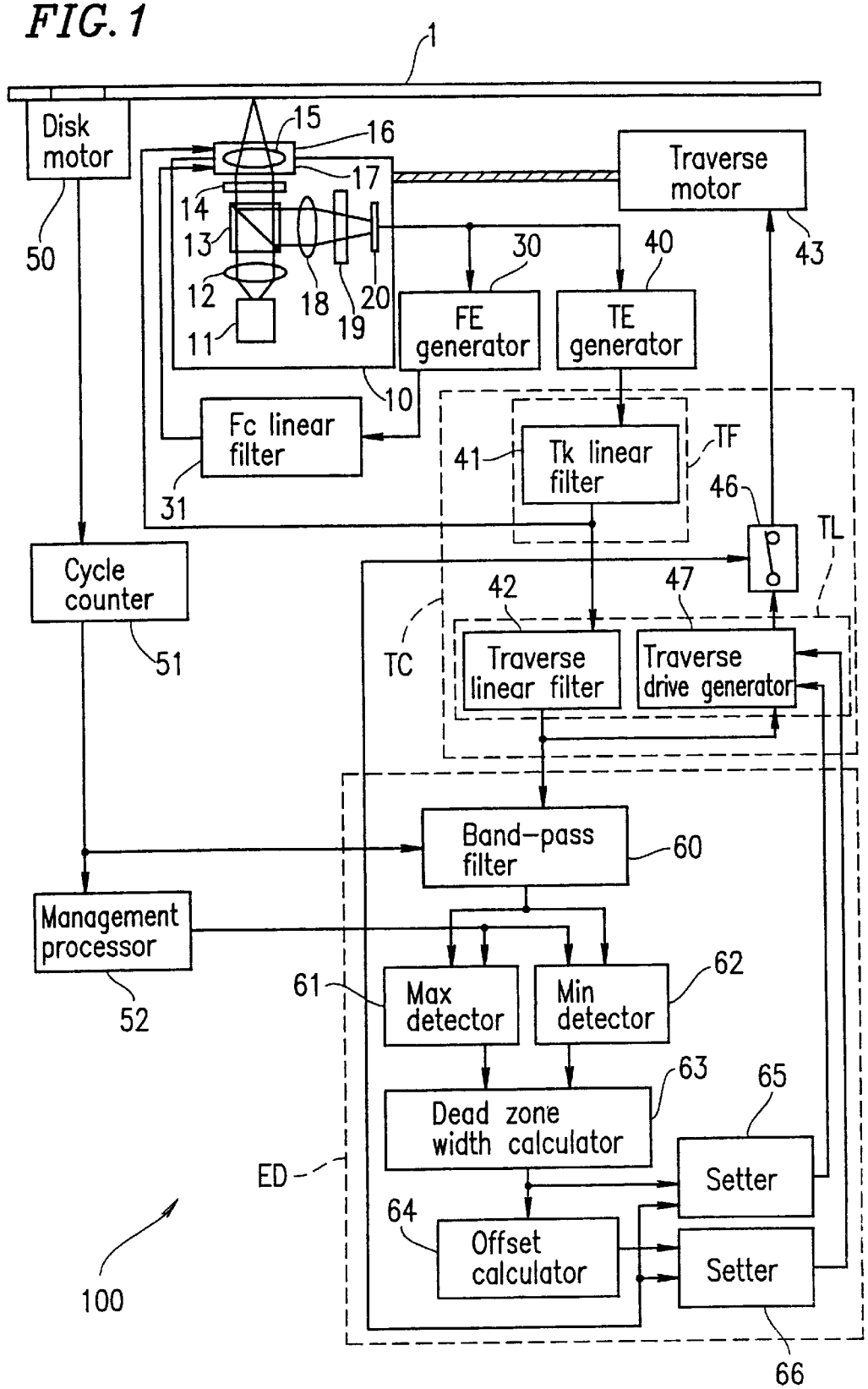
FIG. 1 is a block diagram illustrating an optical disk apparatus according to Example 1 of the present invention.
Figure 8:
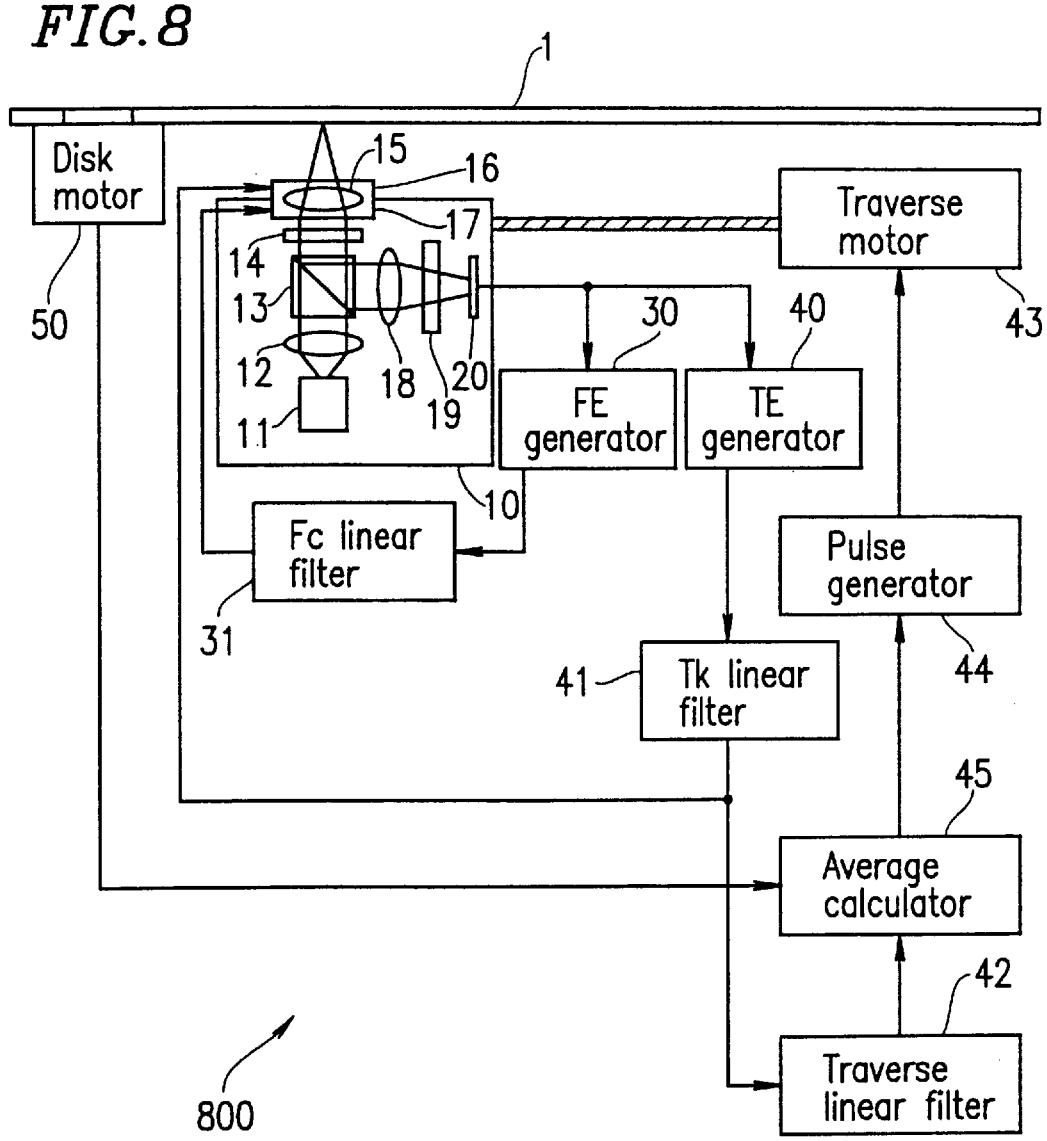
FIG. 8 is a block diagram illustrating a conventional optical disk apparatus.
Figure 9:
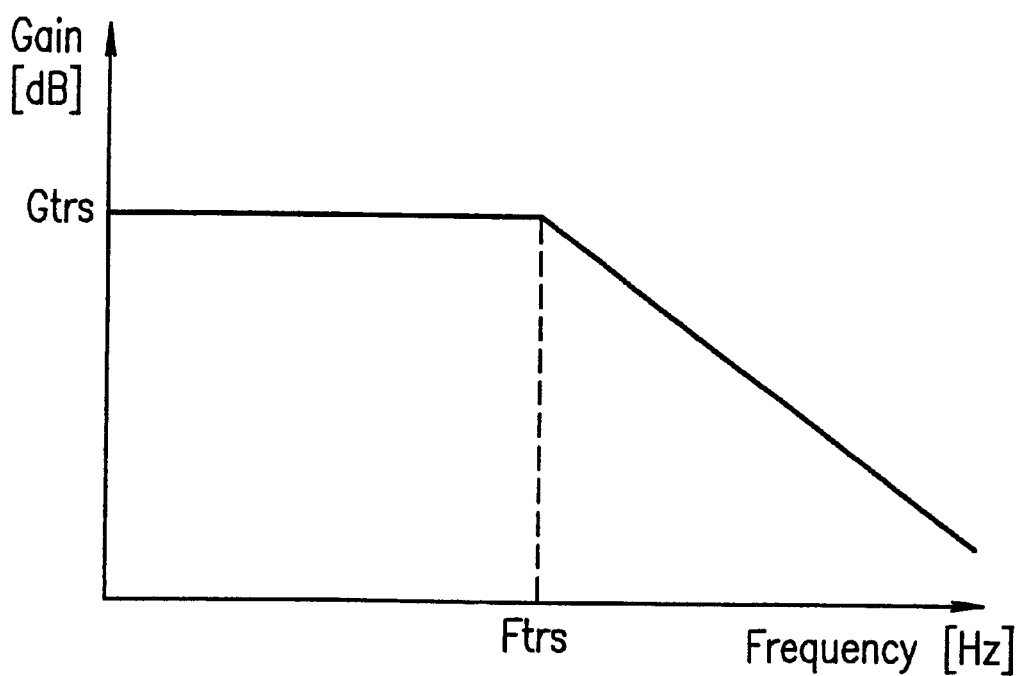
FIG. 9 illustrates a frequency characteristic of a traverse linear filter.

FIG. 1 is a block diagram illustrating an optical disk apparatus 100 according to Example 1 of the present invention. Elements in FIG. 1 having like reference numerals to those shown in FIG. 8 will not further be described.

The optical disk apparatus 100 includes the disk motor 50 for driving the optical disk 1, the optical head 10, the traverse motor 43, the FE generator 30, the Fc linear filter 31, the TE generator 40, a tracking controller TC, an eccentricity detector ED, a cycle counter 51 and a management processor 52.

The optical head 10 includes the semiconductor laser 11, the coupling lens 12, the polarization beam splitter 13, the ¼ wave plate 14, the focusing actuator 16, the tracking actuator 17, the detection lens 18, the cylindrical lens 19 and the photodetector 20.

The tracking controller TC includes a fine tracking controller TF, a coarse tracking controller TL and a switch 46. The fine tracking controller TF includes the Tk linear filter 41. The coarse tracking controller TL includes the traverse linear filter 42 and a traverse drive generator 47.

The eccentricity detector ED includes a band-pass filter 60, a Max detector 61, a Min detector 62, a dead zone width calculator 63, an offset calculator 64, a setter 65 and another setter 66.

The output of the traverse linear filter 42 is connected to the traverse drive generator 47, and a drive signal from the traverse drive generator 47 is sent to the traverse motor 43 via the switch 46. The switch 46 is closed when an adjustment command signal from the management processor 52 is at a low level.

Figure 2:
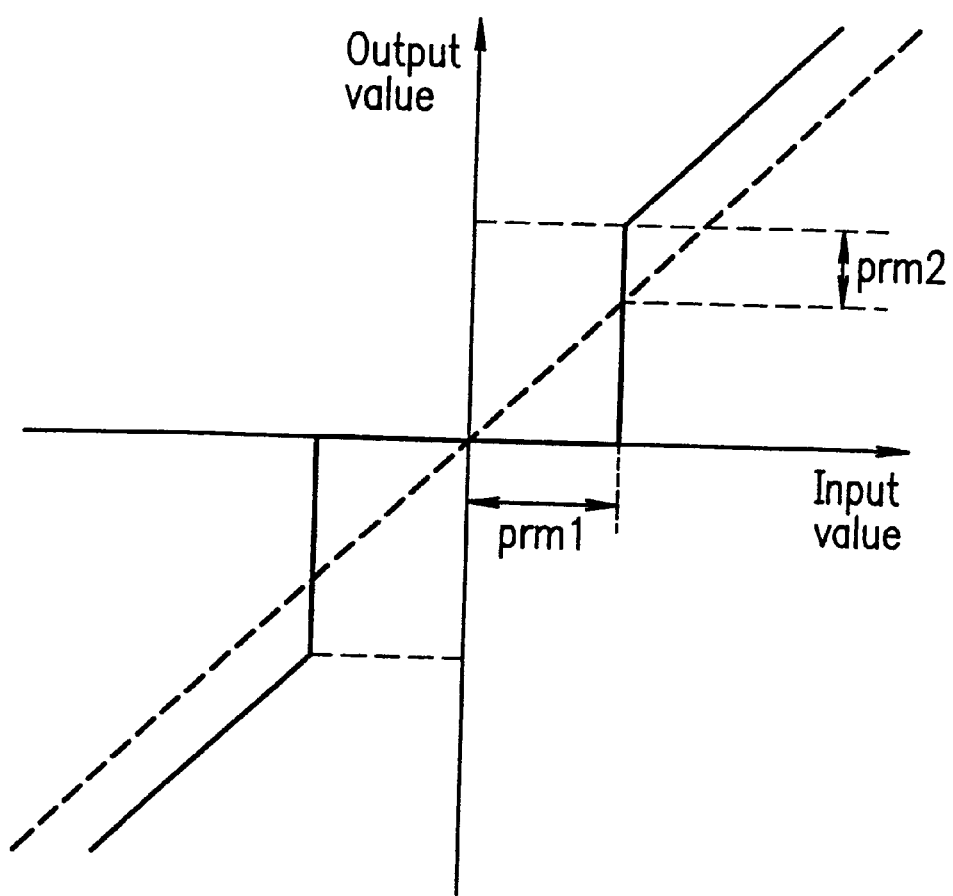
FIG. 2 is a graph illustrating the relationship between an input and an output of a traverse drive generator.

FIG. 2 shows the relationship between the input and the output of the traverse drive generator 47, wherein the horizontal axis represents the input value of the traverse drive generator 47, and the vertical axis represents the output value thereof.

If the absolute value of the input value of the traverse drive generator 47 is less than or equal to a set value prm1, the output value is zero. Where the absolute value is greater than the set value prm1, if the input value is positive, the output value is the input value plus a set value prm2, and if the input value is negative, the output value is the input value minus the set value prm2. The values prm1 and prm2 are set values which influence the input/output relationship of the traverse drive generator 47. The values prm1 and prm2 can be externally set.

The signal from the traverse linear filter 42 is input to the Max detector 61 and the Min detector 62 via the band-pass filter 60. A signal from the cycle counter 51 is input to the band-pass filter 60. The band-pass filter 60 suppresses frequency components other than the revolution cycle of the disk motor 50 obtained from the cycle counter 51 so as to extract the disk motor 50 revolution component from the signal from the traverse linear filter 42.

When the rising edge of the adjustment command signal (see FIG. 3B, for example, to be described later) from the management processor 52 is detected, the Max detector 61 initializes its output with the output from the band-pass filter 60 at that time. Thereafter, based on the initial value, the Max detector 61 outputs to the dead zone width calculator 63 the maximum value of the signal from the band-pass filter 60.

Similarly, when the rising edge of the adjustment command signal from the management processor 52 is detected, the Min detector 62 initializes its output with the output from the band-pass filter 60 at that time. Thereafter, based on the initial value, the Max detector 61 outputs to the dead zone width calculator 63 the minimum value of the signal from the band-pass filter 60.

The dead zone width calculator 63 calculates one half of the value obtained by subtracting the output value of the Min detector 62 from the output value of the Max detector 61, and outputs the obtained value to the offset calculator 64 and to the setter 65. The offset calculator 64 subtracts the value output from the dead zone width calculator 63 from a predetermined value, and outputs the obtained value to the setter 66.

The setter 65 latches the value output from the dead zone width calculator 63 when the falling edge of the adjustment command signal from the management processor 52 is detected. The setter 66 latches the value output from the offset calculator 64 when the falling edge of the adjustment command signal from the management processor 52 is detected. The traverse drive generator 47 uses the value output from the setter 65 as the set value prm1, and the value output from the setter 66 as the set value prm2.

The FG signal from the disk motor 50 is input to the cycle counter 51. The cycle counter 51 measures the time period from one rising edge of the FG signal to the next rising edge thereof, and outputs the measured time period to the management processor 52 and to the band-pass filter 60.

Figure 10A:
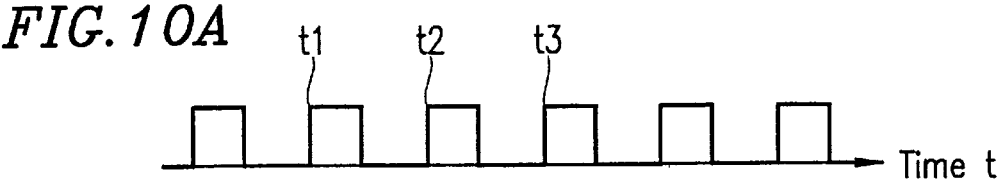
FIG. 10A illustrates an FG signal used when performing a tracking control by the optical disk apparatus of FIG. 8.
Figure 10B:
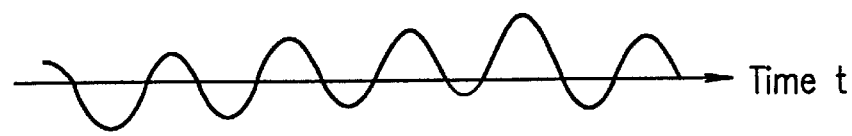
FIG. 10B illustrates an output signal from a traverse linear filter.
Figure 10C:
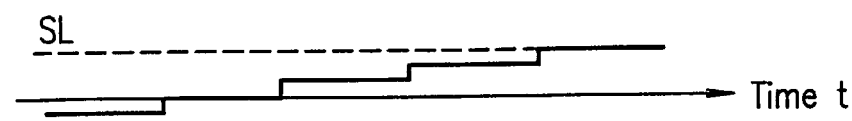
FIG. 10C illustrates an output signal from an average calculator.
Figure 10D:
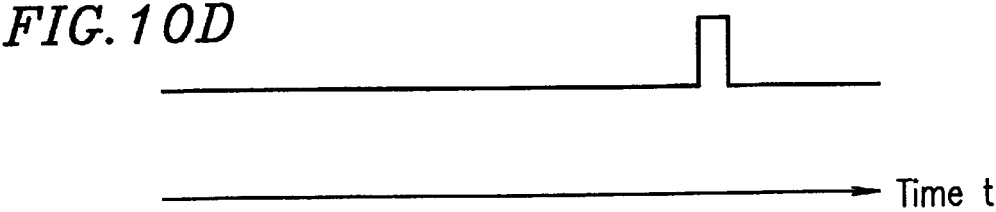
FIG. 10D illustrates a drive signal from a pulse generator to a traverse motor.

The drive waveform for driving the traverse motor 43 is first generated by the traverse linear filter 42. As described above, the output signal from the traverse linear filter 42 has a fluctuation due to the eccentricity of the optical disk 1 as illustrated in FIG. 10B.

In order to prevent the traverse motor 43 from being influenced by the fluctuation, the drive signal to the traverse motor 43 is set to zero if the output waveform from the traverse linear filter 42 is less than or equal to a predetermined level. This is realized by the dead zone determined by the set value prm1 from the traverse drive generator 47.

The drive offset is determined by the set value prm2 of the traverse drive generator 47 so that the magnitude of the drive signal to the traverse motor 43 is equal to or greater than a predetermined level so as to obtain a driving force which overcomes the frictional force when traversing the optical head 10 by the traverse motor 43.

In the optical disk apparatus 100 illustrated in FIG. 1, the magnitude of the fluctuation of the output signal from the traverse linear filter 42 caused by the eccentricity of the optical disk 1 is measured, so as to set the dead zone (the set value prm1) and the drive offset (the set value prm2) of the traverse drive generator 47 according to the measurement.

Figure 3:
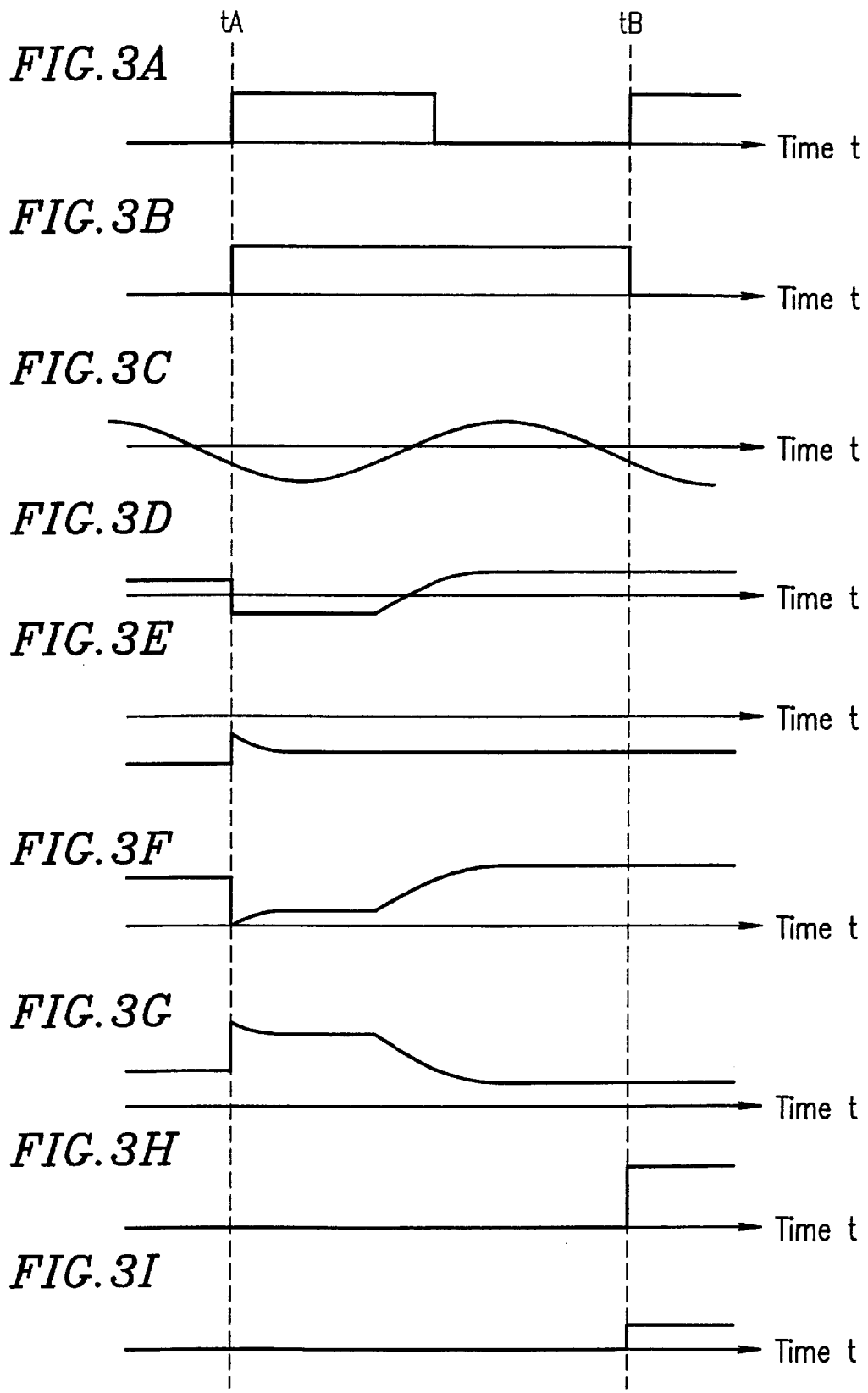
FIG. 3A illustrates an FG signal used when adjusting the traverse drive generator.
FIG. 3B illustrates an adjustment command signal.
FIG. 3C illustrates an input signal to the traverse drive generator.
FIG. 3D illustrates an output signal from a Max detector.
FIG. 3E illustrates an output signal from a Min detector.
FIG. 3F illustrates an output signal from a dead zone width calculator.
FIG. 3G illustrates an output signal from an offset calculator.
FIG. 3H illustrates a signal representing a set value prm1 from a setter.
FIG. 3I illustrates a signal representing a set value prm2 from another setter.

A sequence for determining the dead zone (the set value prm1) and the drive offset (the set value prm2) will be described with reference to the waveform diagrams of FIGS. 3A to 3I. FIG. 3A illustrates the FG signal from the disk motor 50, FIG. 3B illustrates the adjustment command signal from the management processor 52, FIG. 3C illustrates a signal from the traverse linear filter 42, FIG. 3D illustrates a signal from the Max detector 61, FIG. 3E illustrates a signal from the Min detector 62, FIG. 3F illustrates a signal from the dead zone width calculator 63, FIG. 3G illustrates a signal from the offset calculator 64, FIG. 3H illustrates the set value prm1 of the traverse drive generator 47, and FIG. 3I illustrates the set value prm2 of the traverse drive generator 47.

The management processor 52 constantly obtains the revolution cycle of the disk motor 50 from the signal from the cycle counter 51. In a normal control state, the management processor 52 sends a low level signal to the switch 46, the Max detector 61, the Min detector 62, the setter 65 and the setter 66.

To initiate the sequence, the time period for one revolution of the disk motor 50 is measured by the cycle counter 51. As illustrated in FIG. 3B, the management processor 52 outputs the adjustment command signal which is at a high level during one revolution of the disk motor 50 during a time period from time tA to time tB.

While the adjustment command signal is at a high level, the traverse motor 43 is inactivated so as to eliminate the influence of the TE generator 40 on the TE signal which may be caused by the activation of the traverse motor 43. To do this, while the adjustment command signal is at a high level, the switch 46 is controlled so that the drive signal from the traverse drive generator 47 to the traverse motor 43 is zero.

The magnitude of the fluctuation of the output signal from the traverse linear filter 42 caused by the eccentricity of the optical disk 1 is measured by calculating the difference between the maximum value and the minimum value of the output signal from the traverse linear filter 42 during one revolution of the disk motor 50.

When a rising edge of the adjustment command signal is detected, the Max detector 61 and the Min detector 62 initialize their respective output values. Then, until the adjustment command signal from the management processor 52 goes low, the Max detector 61 detects the maximum value of the signal from the band-pass filter 60 and the Min detector 62 detects the minimum value thereof. By the use of the band-pass filter 60, the detection can be done while eliminating the signal noise component and the disturbance component.

As illustrated in FIGS. 3D and 3E, the Max detector 61 and the Min detector 62 initialize their respective output values with the value from the band-pass filter 60 at time tA, and then respectively measure the maximum value and the minimum value of the signal from the band-pass filter 60 until time tB.

As illustrated in FIG. 3F, the dead zone width calculator 63 constantly outputs one half of the value obtained by subtracting the output value of the Min detector 62 from the output value of the Max detector 61. The output value of the dead zone width calculator 63 corresponds to the magnitude of the disk motor 50 revolution cycle component of the fluctuation of the output signal from the traverse linear filter 42 caused by the eccentricity of the optical disk 1. The output value of the dead zone width calculator 63 is the set value prm1 of the traverse drive generator 47 used for realizing the dead zone.

As illustrated in FIG. 3G, the offset calculator 64 subtracts the signal from the dead zone width calculator 63 from a predetermined level. This value is the drive offset (the set value prm2 of the traverse drive generator 47) which is used so that the output from the traverse drive generator 47 is equal to or greater than a predetermined level when the signal from the traverse linear filter 42 exceeds the dead zone width.

By using the initial drive signal level of the traverse motor 43, which is determined by the system frictional force, as the above-described predetermined level, the drive signal from the traverse drive generator 47 efficiently drives the traverse motor 43.

Thereafter, when a falling edge of the adjustment command signal from the management processor 52 is detected at time tB, the setter 65 latches the output value of the dead zone width calculator 63 at that time, as illustrated in FIG. 3H. The latched value is used by the traverse drive generator 47 as the set value prm1. At this time, the setter 66 latches the output value of the offset calculator 64, as illustrated in FIG. 3I. The latched value is used by the traverse drive generator 47 as the set value prm2.

When the adjustment command signal from the management processor 52 goes low, the switch 46 allows the drive signal from the traverse drive generator 47 to be input to the traverse motor 43, so that the traverse motor 43 is driven based on the set values prm1 and prm2 of the traverse drive generator 47.

Thus, when the signal from the traverse linear filter 42 is only influenced by the eccentricity of the optical disk 1, the traverse motor 43 is not activated, and the light beam is only tracking-controlled by the tracking actuator 17.

As the DC drive component of the tracking actuator 17 increases, and the signal from the traverse linear filter 42 becomes greater than that which is only influenced by the eccentricity of the optical disk 1, the traverse drive generator 47 then outputs a drive signal which is sufficient to activate the traverse motor 43.

This operation continues until the DC drive component of the tracking actuator 17 is reduced below the above-described dead zone by the activation of the traverse motor 43. During such an operation, the activation of the traverse motor 43 is ensured because the above-described drive signal increases as the DC drive component of the tracking actuator 17 increases.

Where the mass eccentricity of the optical disk 1 is relatively large, as the number of revolutions of the optical disk 1 changes, the actual amount of eccentricity varies depending upon the mass eccentricity and the number of revolutions of the optical disk 1. Therefore, the set values prm1 and prm2 of the traverse drive generator 47 are readjusted when the number of revolutions of the optical disk 1 has changed by a predetermined number from that when the set values prm1 and prm2 were previously adjusted.

The management processor 52 constantly obtains the number of revolutions of the optical disk 1 from the signal from the cycle counter 51. The management processor 52 stores the number of revolutions of the optical disk 1 when the set values prm1 and prm2 of the traverse drive generator 47 are adjusted. Thus, when the difference between the stored number of revolutions and the current number of revolutions exceeds a predetermined value, the management processor 52 outputs the adjustment command signal so as to initiate the above-described adjustment operation.

As described above, Example 1 of the present invention realizes a tracking control which efficiently uses the supplied power and is not influenced by the eccentricity of the optical disk 1. Moreover, the wave height of the drive signal to be applied to the traverse motor 43 is not fixed. Thus, even when the frictional force substantially in creases over time, the wave height can be increased so as to reliably drive the traverse motor 43.

Furthermore, the output timing of the drive signal to the traverse motor 43 is not dependent upon the rotational position of the disk motor 50. Moreover, even when the actual eccentricity varies depending upon the number of revolutions of the disk motor 50, a readjustment operation can be performed to account for such a variation.

Example 2

Figure 4:
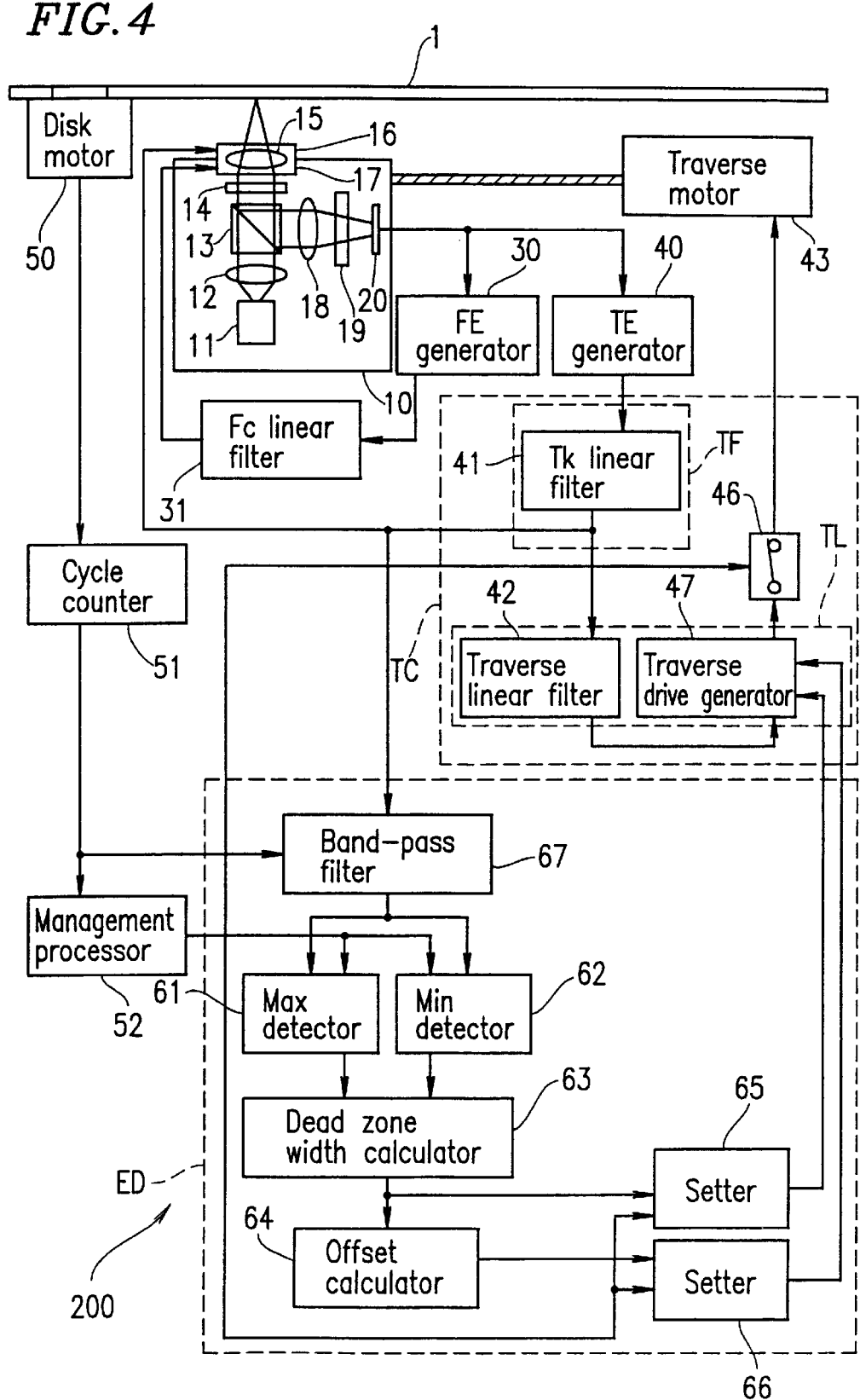
FIG. 4 is a block diagram illustrating an optical disk apparatus according to Example 2 of the present invention.

FIG. 4 is a block diagram illustrating an optical disk apparatus 200 according to Example 2 of the present invention. Elements in FIG. 4 having like reference numerals to those shown in FIG. 1 will not further be described.

The signal from the Tk linear filter 41 is input to the Max detector 61 and to the Min detector 62 via a band-pass filter 67. The signal from the cycle counter 51 is input to the band-pass filter 67, and the band-pass filter 67 amplifies the frequency component of the disk motor 50 revolution cycle obtained from the cycle counter 51 with the same gain as that of the traverse linear filter 42, while suppressing the other frequency components, thereby extracting the disk motor 50 revolution component from the signal from the Tk linear filter 41.

In the optical disk apparatus 200 illustrated in FIG. 4, the magnitude of the fluctuation of the output signal from the Tk linear filter 41 caused by the eccentricity of the optical disk 1 is measured, so as to set the dead zone and the drive offset of the traverse drive generator 47 according to the measurement.

Figure 5:
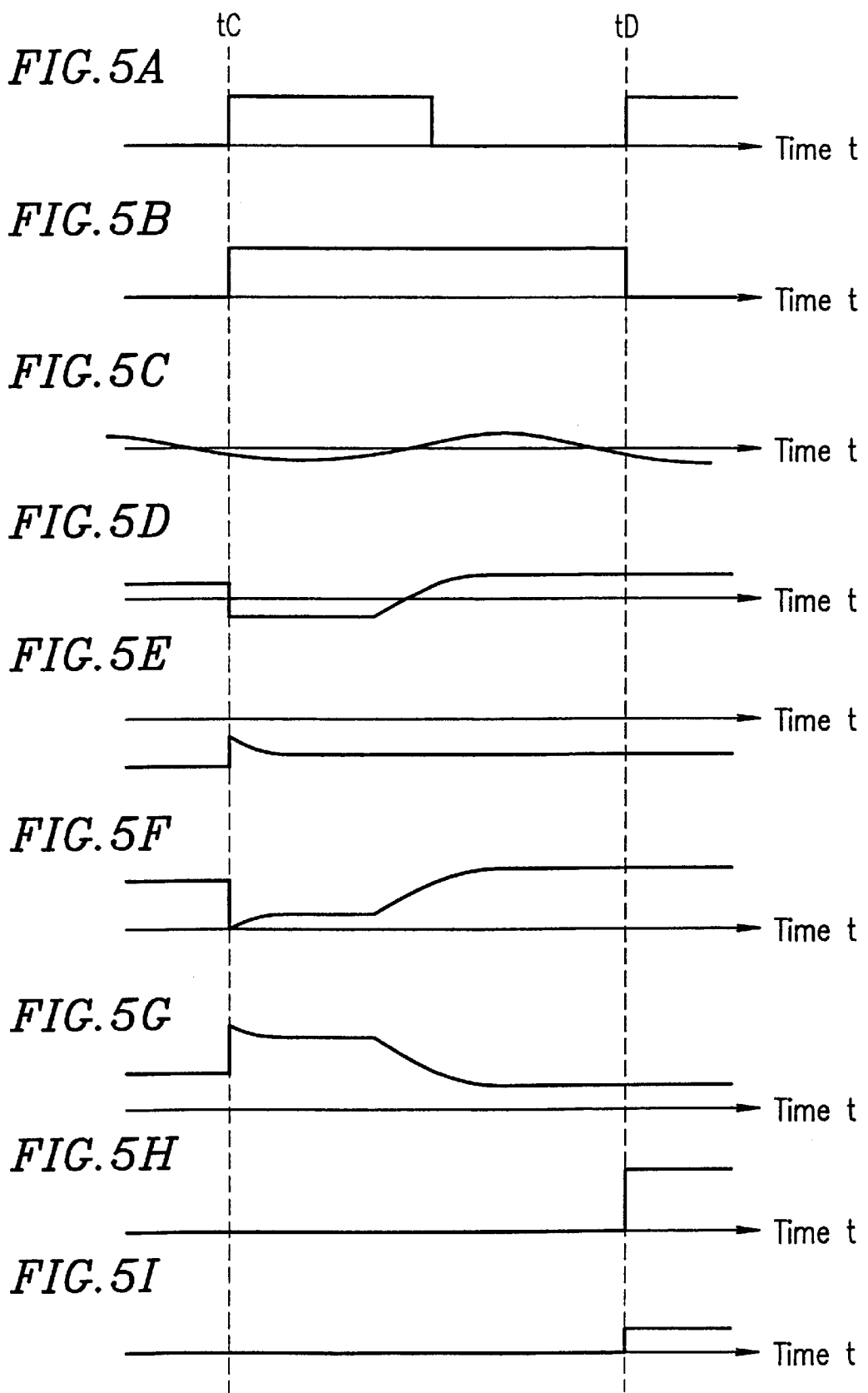
FIG. 5A illustrates an FG signal used when adjusting the traverse drive generator.
FIG. 5B illustrates an adjustment command signal.
FIG. 5C illustrates an input signal to the traverse drive generator.
FIG. 5D illustrates an output signal from a Max detector.
FIG. 5E illustrates an output signal from a Min detector.
FIG. 5F illustrates an output signal from a dead zone width calculator.
FIG. 5G illustrates an output signal from an offset calculator.
FIG. 5H illustrates a signal representing a set value prm1 from a setter.
FIG. 5I illustrates a signal representing a set value prm2 from another setter.

A sequence for determining the dead zone and the drive offset will be described with reference to the waveform diagrams of FIGS. 5A to 5I. FIG. 5A illustrates the FG signal from the disk motor 50, FIG. 5B illustrates the adjustment command signal from the management processor 52, FIG. 5C illustrates a signal from the Tk linear filter 41, FIG. 5D illustrates a signal from the Max detector 61, FIG. 5E illustrates a signal from the Min detector 62, FIG. 5F illustrates a signal from the dead zone width calculator 63, FIG. 5G illustrates a signal from the offset calculator 64, FIG. 5H illustrates the set value prm1 of the traverse drive generator 47, and FIG. 5I illustrates the set value prm2 of the traverse drive generator 47.

The management processor 52 constantly obtains the revolution cycle of the disk motor 50 from the signal from the cycle counter 51. In a normal control state, the management processor 52 sends a low level signal to the switch 46, the Max detector 61, the Min detector 62, the setter 65 and the setter 66.

To initiate the sequence, the time period for one revolution of the disk motor 50 is measured by the cycle counter 51. As illustrated in FIG. 5B, the management processor 52 outputs the adjustment command signal which is at a high level during one revolution of the disk motor 50 during a time period from time tC to time tD.

While the adjustment command signal is at a high level, the traverse motor 43 is inactivated so as to eliminate the influence of the TE generator 40 on the TE signal which may be caused by the activation of the traverse motor 43. To do this, while the adjustment command signal is at a high level, the switch 46 is controlled so that the drive signal from the traverse drive generator 47 to the traverse motor 43 is zero.

The magnitude of the fluctuation of the output signal from the Tk linear filter 41 caused by the eccentricity of the optical disk 1 is measured by calculating the difference between the maximum value and the minimum value of the output signal from the Tk linear filter 41 during one revolution of the disk motor 50.

When a rising edge of the adjustment command signal is detected, the Max detector 61 and the Min detector 62 initialize their respective output values. Then, until the adjustment command signal from the management processor 52 goes low, the Max detector 61 detects the maximum value of the signal from the band-pass filter 67 and the Min detector 62 detects the minimum value thereof. By the use of the band-pass filter 67, the detection can be done while eliminating the signal noise component and the disturbance component.

As illustrated in FIGS. 5D and 5E, the Max detector 61 and the Min detector 62 initialize their respective output values with the value from the band-pass filter 67 at time tC, and then respectively measure the maximum value and the minimum value of the signal from the band-pass filter 67 until time tD.

As illustrated in FIG. 5F, the dead zone width calculator 63 constantly outputs one half of the value obtained by subtracting the output value of the Min detector 62 from the output value of the Max detector 61. This value is obtained by multiplying the magnitude of the disk motor 50 revolution cycle component of the fluctuation of the output signal from the Tk linear filter 41 caused by the eccentricity of the optical disk 1, by the gain of the traverse linear filter 42. The output value of the dead zone width calculator 63 is the set value prm1 of the traverse drive generator 47 used for realizing the dead zone.

As illustrated in FIG. 5G, the offset calculator 64 subtracts the signal from the dead zone width calculator 63 from a predetermined level. This value is the drive offset (the set value prm2 of the traverse drive generator 47) which is used so that the output from the traverse drive generator 47 is equal to or greater than a predetermined level when the signal from the traverse linear filter 42 exceeds the dead zone width.

By using the initial drive signal level of the traverse motor 43, which is determined by the system frictional force, as the above-described predetermined level, the drive signal from the traverse drive generator 47 efficiently drives the traverse motor 43.

Thereafter, when a falling edge of the adjustment command signal from the management processor 52 is detected at time tD, the setter 65 latches the output value of the dead zone width calculator 63 at that time, as illustrated in FIG. 5H. The latched value is used by the traverse drive generator 47 as the set value prm1. At this time, the setter 66 latches the output value of the offset calculator 64, as illustrated in FIG. 5I. The latched value is used by the traverse drive generator 47 as the set value prm2.

When the adjustment command signal from the management processor 52 goes low, the switch 46 allows the drive signal from the traverse drive generator 47 to be input to the traverse motor 43, so that the traverse motor 43 is driven based on the set values prm1 and prm2 of the traverse drive generator 47.

Thus, when the signal from the traverse linear filter 42 is only influenced by the eccentricity of the optical disk 1, the traverse motor 43 is not activated, and the light beam is only tracking-controlled by the tracking actuator 17.

As the DC drive component of the tracking actuator 17 increases, and the signal from the traverse linear filter 42 becomes greater than that which is only influenced by the eccentricity of the optical disk 1, the traverse drive generator 47 then outputs a drive signal which is sufficient to activate the traverse motor 43.

This operation continues until the DC drive component of the tracking actuator 17 is reduced below the above-described dead zone by the activation of the traverse motor 43. During such an operation, the activation of the traverse motor 43 is ensured because the above-described drive signal increases as the DC drive component of the tracking actuator 17 increases.

Where the mass eccentricity of the optical disk 1 is relatively large, as the number of revolutions of the optical disk 1 changes, the actual amount of eccentricity varies depending upon the mass eccentricity and the number of revolutions of the optical disk 1. Therefore, the set values prm1 and prm2 of the traverse drive generator 47 are readjusted when the number of revolutions of the optical disk 1 has changed by a predetermined number from that when the set values prm1 and prm2 were previously adjusted.

The management processor 52 constantly obtains the number of revolutions of the optical disk 1 from the signal from the cycle counter 51. The management processor 52 stores the number of revolutions of the optical disk 1 when the set values prm1 and prm2 of the traverse drive generator 47 are adjusted. Thus, when the difference between the stored number of revolutions and the current number of revolutions exceeds a predetermined value, the management processor 52 outputs the adjustment command signal so as to initiate the above-described adjustment operation.

As described above, Example 2 of the present invention also realizes a tracking control which efficiently uses the supplied power and is not influenced by the eccentricity of the optical disk 1. Moreover, the wave height of the drive signal to be applied to the traverse motor 43 is not fixed. Thus, even when the frictional force substantially increases over time, the wave height can be increased so as to reliably drive the traverse motor 43.

Furthermore, the output timing of the drive signal to the traverse motor 43 is not dependent upon the rotational position of the disk motor 50. Moreover, even when the actual eccentricity varies depending upon the number of revolutions of the disk motor 50, a readjustment operation can be performed to account for such a variation.

Example 3

Figure 6:
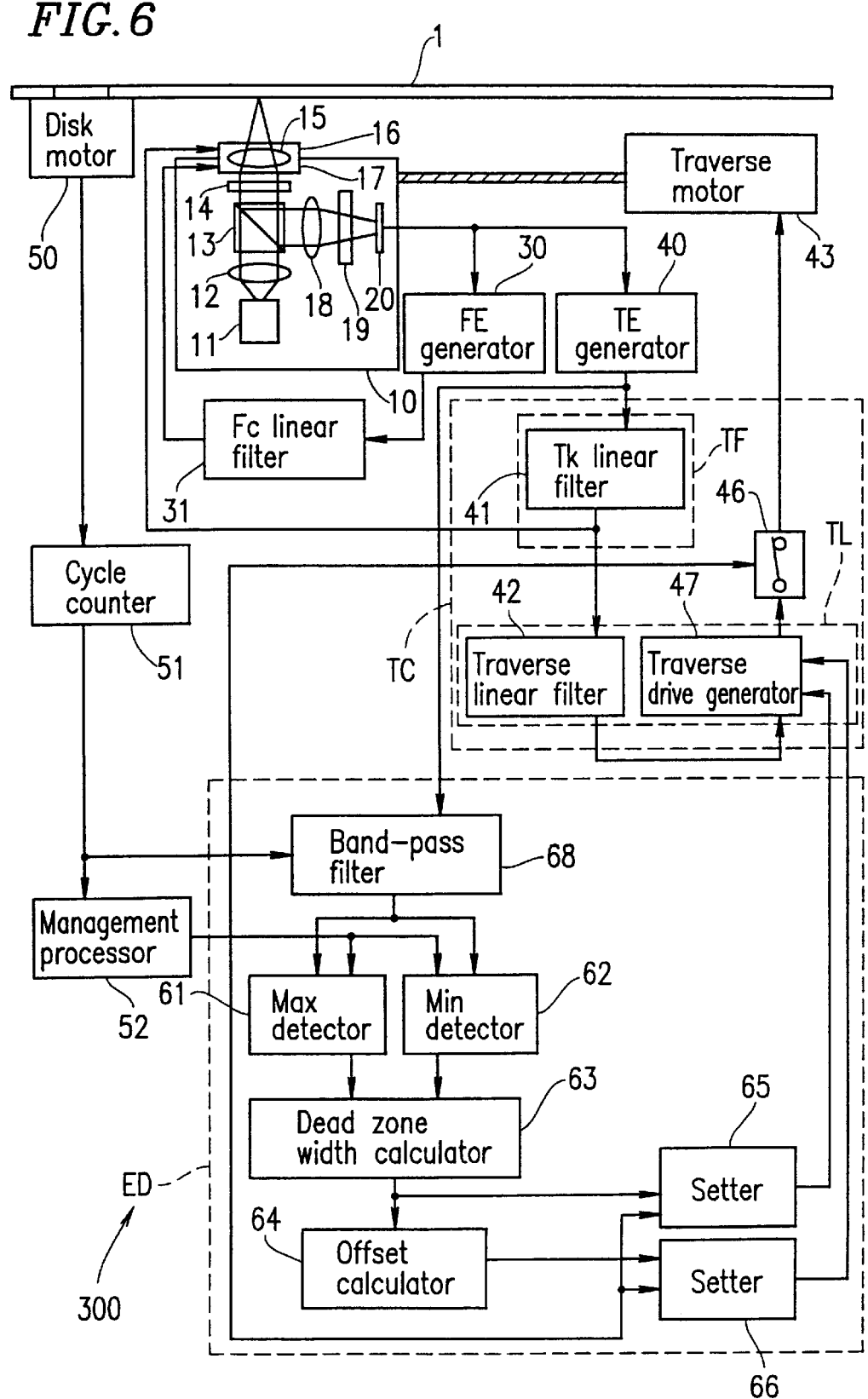
FIG. 6 is a block diagram illustrating an optical disk apparatus according to Example 3 of the present invention.

FIG. 6 is a block diagram illustrating an optical disk apparatus 300 according to Example 3 of the present invention. Elements in FIG. 6 having like reference numerals to those shown in FIG. 1 will not further be described.

The signal from the TE generator 40 is input to the Max detector .61 and to the Min detector 62 via a band-pass filter 68. The signal from the cycle counter 51 is input to the band-pass filter 68, and the band-pass filter 68 amplifies the frequency component of the disk motor 50 revolution cycle obtained from the cycle counter 51 with the same gain as that of the Tk linear filter 41, while suppressing the other frequency components, thereby extracting the disk motor 50 revolution component from the signal from the TE generator 40.

In the optical disk apparatus 300 illustrated in FIG. 6, the magnitude of the fluctuation of the output signal from the TE generator 40 caused by the eccentricity of the optical disk 1 is measured, so as to set the dead zone and the drive offset of the traverse drive generator 47 according to the measurement.

Figure 7:
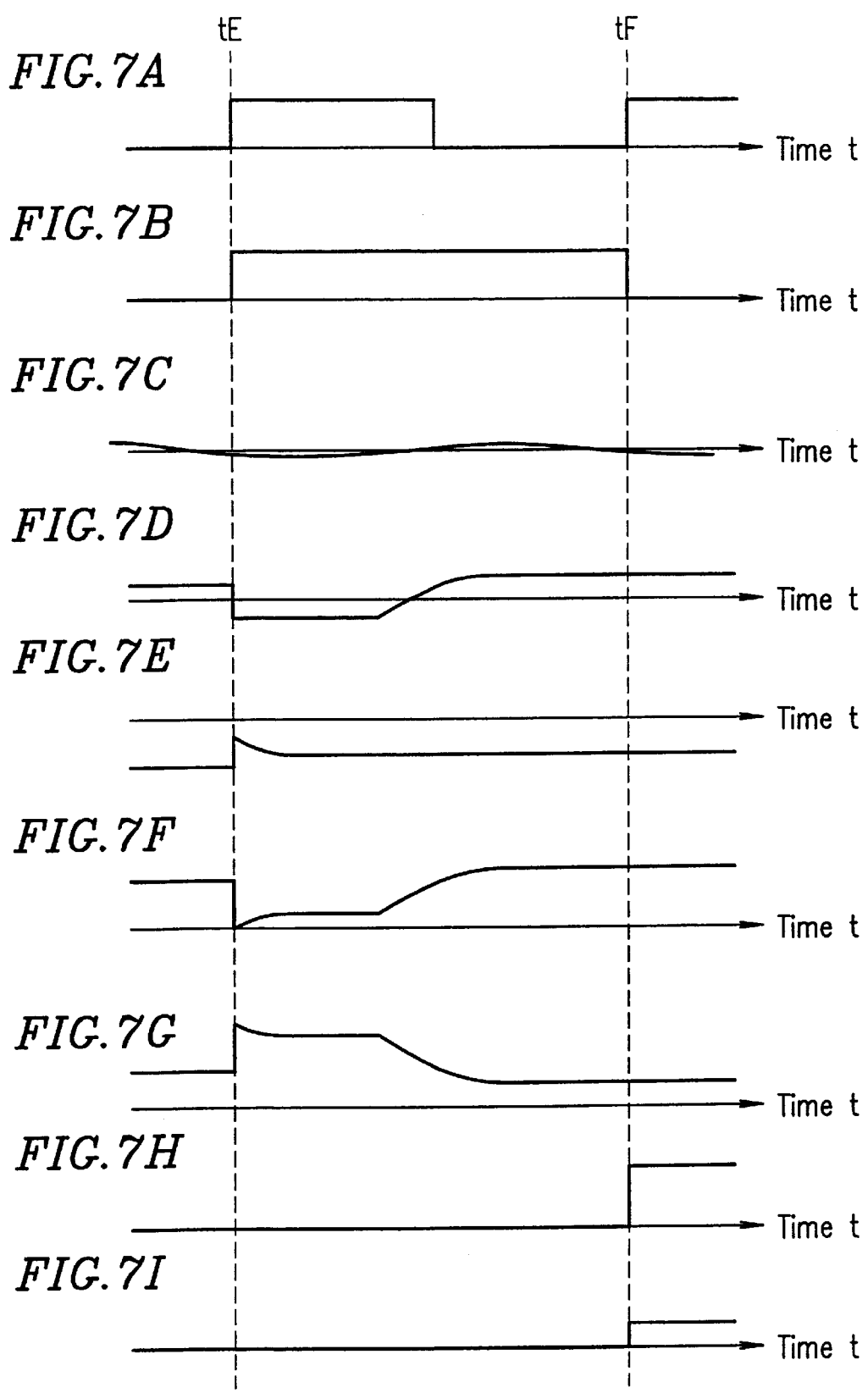
FIG. 7A illustrates an FG signal used when adjusting the traverse drive generator.
FIG. 7B illustrates an adjustment command signal.
FIG. 7C illustrates an input signal to the traverse drive generator.
FIG. 7D illustrates an output signal from a Max detector.
FIG. 7F illustrates an output signal from a dead zone width calculator.
FIG. 7G illustrates an output signal from an offset calculator.
FIG. 7H illustrates a signal representing a set value prm1 from a setter.
FIG. 7I illustrates a signal representing a set value prm2 from another setter.

A sequence for determining the dead zone and the drive offset will be described with reference to the waveform diagrams of FIGS. 7A to 7I. FIG. 7A illustrates the FG signal from the disk motor 50, FIG. 7B illustrates the adjustment command signal from the management processor 52, FIG. 7C illustrates a signal from the TE generator 40, FIG. 7D illustrates a signal from the Max detector 61, FIG. 7E illustrates a signal from the Min detector 62, FIG. 7F illustrates a signal from the dead zone width calculator 63, FIG. 7G illustrates a signal from the offset calculator 64, FIG. 7H illustrates the set value prm1 of the traverse drive generator 47, and FIG. 7I illustrates the set value prm2 of the traverse drive generator 47.

The management processor 52 constantly obtains the revolution cycle of the disk motor 50 from the signal from the cycle counter 51. In a normal control state, the management processor 52 sends a low level signal to the switch 46, the Max detector 61, the Min detector 62, the setter 65 and the setter 66.

To initiate the sequence, the time period for one revolution of the disk motor 50 is measured by the cycle counter 51. As illustrated in FIG. 7B, the management processor 52 outputs the adjustment command signal which is at a high level during one revolution of the disk motor 50 during a time period from time tE to time tF.

While the adjustment command signal is at a high level, the traverse motor 43 is inactivated so as to eliminate the influence of the TE generator 40 on the TE signal which may be caused by the activation of the traverse motor 43. To do this, while the adjustment command signal is at a high level, the switch 46 is controlled so that the drive signal from the traverse drive generator 47 to the traverse motor 43 is zero.

The magnitude of the fluctuation of the output signal from the TE generator 40 caused by the eccentricity of the optical disk 1 is measured by calculating the difference between the maximum value and the minimum value of the output signal from the TE generator 40 during one revolution of the disk motor 50.

When a rising edge of the adjustment command signal (FIG. 7B) is detected, the Max detector 61 and the Min detector 62 initialize their respective output values. Then, until the adjustment command signal from the management processor 52 goes low, the Max detector 61 detects the maximum value of the signal from the band-pass filter 68 and the Min detector 62 detects the minimum value thereof. By the use of the band-pass filter 68, the detection can be done while eliminating the signal noise component and the disturbance component.

As illustrated in FIGS. 7D and 7E, the Max detector 61 and the Min detector 62 initialize their respective output values with the value from the band-pass filter 68 at time tE, and then respectively measure the maximum value and the minimum value of the signal from the band-pass filter 68 until time tF.

As illustrated in FIG. 7F, the dead zone width calculator 63 constantly outputs one half of the value obtained by subtracting the output value of the Min detector 62 from the output value of the Max detector 61. This value is obtained by multiplying the magnitude of the disk motor 50 revolution cycle component of the fluctuation of the output signal from the TE generator 40 caused by the eccentricity of the optical disk 1, by the gain of the Tk linear filter 41 and the gain of the traverse linear filter 42. The output value of the dead zone width calculator 63 is the set value prm1 of the traverse drive generator 47 used for realizing the dead zone.

As illustrated in FIG. 7G, the offset calculator 64 subtracts the signal from the dead zone width calculator 63 from a predetermined level. This value is the drive offset (the set value prm2 of the traverse drive generator 47) which is used so that the output from the traverse drive generator 47 is equal to or greater than a predetermined level when the signal from the traverse linear filter 42 exceeds the dead zone width.

By using the initial drive signal level of the traverse motor 43, which is determined by the system frictional force, as the above-described predetermined level, the drive signal from the traverse drive generator 47 efficiently drives the traverse motor 43.

Thereafter, when a falling edge of the adjustment command signal from the management processor 52 is detected at time tF, the setter 65 latches the output value of the dead zone width calculator 63 at that time, as illustrated in FIG. 7H. The latched value is used by the traverse drive generator 47 as the set value prm1. At this time, the setter 66 latches the output value of the offset calculator 64, as illustrated in FIG. 7I. The latched value is used by the traverse drive generator 47 as the set value prm2.

When the adjustment command signal from the management processor 52 goes low, the switch 46 allows the drive signal from the traverse drive generator 47 to be input to the traverse motor 43, so that the traverse motor 43 is driven based on the set values prm1 and prm2 of the traverse drive generator 47.

Thus, when the signal from the traverse linear filter 42 is only influenced by the eccentricity of the optical disk 1, the traverse motor 43 is not activated, and the light beam is only tracking-controlled by the tracking actuator 17.

As the DC drive component of the tracking actuator 17 increases, and the signal from the traverse linear filter 42 becomes greater than that which is only influenced by the eccentricity of the optical disk 1, the traverse drive generator 47 then outputs a drive signal which is sufficient to activate the traverse motor 43.

This operation continues until the DC drive component of the tracking actuator 17 is reduced below the above-described dead zone by the activation of the traverse motor 43. During such an operation, the activation of the traverse motor 43 is ensured because the above-described drive signal increases as the DC drive component of the tracking actuator 17 increases.

Where the mass eccentricity of the optical disk 1 is relatively large, as the number of revolutions of the optical disk 1 changes, the actual amount of eccentricity varies depending upon the mass eccentricity and the number of revolutions of the optical disk 1. Therefore, the set values prm1 and prm2 of the traverse drive generator 47 are readjusted when the number of revolutions of the optical disk 1 has changed by a predetermined number from that when the set values prm1 and prm2 were previously adjusted.

The management processor 52 constantly obtains the number of revolutions of the optical disk 1 from the signal from the cycle counter 51. The management processor 52 stores the number of revolutions of the optical disk 1 when the set values prm1 and prm2 of the traverse drive generator 47 are adjusted. Thus, when the difference between the stored number of revolutions and the current number of revolutions exceeds a predetermined value, the management processor 52 outputs the adjustment command signal so as to initiate the above-described adjustment operation.

As described above, Example 3 of the present invention also realizes a tracking control which efficiently uses the supplied power and is not influenced by the eccentricity of the optical disk 1. Moreover, the wave height of the drive signal to be applied to the traverse motor 43 is not fixed. Thus, even when the frictional force substantially increases over time, the wave height can be increased so as to reliably drive the traverse motor 43.

Furthermore, the output timing of the drive signal to the traverse motor 43 is not dependent upon the rotational position of the disk motor 50. Moreover, even when the actual eccentricity varies depending upon the number of revolutions of the disk motor 50, a readjustment operation can be performed to account for such a variation.

The present invention has been specifically described above with respect to Examples 1 to 3, though the present invention is not in any way limited to those specific examples set forth above. While a rotational motor is used as the traverse motor in the above-described examples, the traverse motor may alternatively be a linear motor.

As described above, the present invention provides an optical disk apparatus capable of driving a traverse motor even when the frictional force of the traverse motor itself or the frictional force of the mechanism for traversing the optical head increases over time.

The present invention also provides an optical disk apparatus where the traverse motor has a desirable response speed even when the number of revolutions of the disk motor is small.

With the optical disk apparatus of the present invention, the eccentricity of the optical disk is measured, and the traverse motor is controlled based on the measurement. Thus, it is possible to optimize the accuracy of the movement of the traverse motor according to the optical disk being used.

Moreover, the traverse motor is not activated by the eccentricity. When there occurs a DC drive component of the tracking actuator, the traverse motor can be driven with a high accuracy with a delay less than or equal to a time period corresponding to one revolution of the disk.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk apparatus for irradiating a track on an information carrier on which information is recorded with a light beam so as to reproduce information from the track, the optical disk comprising:

a tracking error detector for detecting a tracking error signal representing a displacement between the light beam and the track;

a fine movement section for moving the light beam in a substantially radial direction of the information carrier;

a coarse movement section for moving the fine movement section in the substantially radial direction of the information carrier;

a tracking controller for controlling the fine movement section and the coarse movement section based on the tracking error signal detected by the tracking error detector so that the light beam is positioned along the track; and an eccentricity detector for detecting an amount of eccentricity of the track on the information carrier, wherein the coarse movement section is activated when a signal level from the tracking controller becomes greater than that which is only influenced by the eccentricity detected by the eccentricity detector.

2. An optical disk apparatus according to claim 1, wherein the eccentricity detector detects the amount of eccentricity based on an output of the tracking controller.

3. An optical disk apparatus according to claim 1, wherein the tracking controller comprises:

a fine tracking controller for controlling the fine movement section based on the tracking error signal so that the light beam is positioned along the track; and a coarse tracking controller for controlling the coarse movement section so that an amount of movement of the fine movement section by the fine tracking controller is zero on average.

4. An optical disk apparatus according to claim 3, wherein the eccentricity detector detects the amount of eccentricity based on an output of the coarse tracking controller.

5. An optical disk apparatus according to claim 4, wherein the eccentricity detector detects the amount of eccentricity based on an amplitude of an alternating current component of a control signal which is used by the coarse tracking controller for controlling the coarse movement section.

6. An optical disk apparatus according to claim 3, wherein the coarse tracking controller comprises:

a traverse linear filter for outputting a first drive signal for driving the coarse movement section based on an output of the fine tracking controller; and a traverse drive generator for outputting a second drive signal for driving the coarse movement section based on the first drive signal output from the traverse linear filter and based on the amount of eccentricity detected by the eccentricity detector, and wherein the eccentricity detector detects the amount of eccentricity based on the first drive signal output from the traverse linear filter.

7. An optical disk apparatus according to claim 3, wherein the eccentricity detector detects the amount of eccentricity based on an output from the fine tracking controller.

8. An optical disk apparatus according to claim 7, wherein the eccentricity detector detects the amount of eccentricity based on an amplitude of an alternating current component of a control signal which is used by the fine tracking controller for controlling the fine movement section.

9. An optical disk apparatus according to claim 1, wherein the eccentricity detector detects the amount of eccentricity based on an output of the tracking error detector.

10. An optical disk apparatus according to claim 9, wherein the eccentricity detector detects the amount of eccentricity based on an amplitude of an alternating current component of the output of the tracking error detector.

11. An optical disk apparatus according to claim 3, wherein the coarse tracking controller comprises:
- a traverse linear filter for outputting a first drive signal for driving the coarse movement section based on an output of the fine tracking controller; and
- a traverse drive generator for outputting a second drive signal for driving the coarse movement section based on the first drive signal output from the traverse linear filter and based on the amount of eccentricity detected by the eccentricity detector.

12. An optical disk apparatus according to claim 1, wherein:
- the eccentricity detector comprises an offset calculator for calculating a drive offset to be added to a drive signal for driving the coarse movement section based on the amount of eccentricity; and
- the tracking controller controls the coarse movement section based on the drive offset calculated by the offset calculator.

13. An optical disk apparatus for irradiating a track on an information carrier on which information is recorded with a light beam so as to reproduce information from the track, the optical disk comprising:
- a tracking error detector for detecting a tracking error signal representing a displacement between the light beam and the track;
- a fine movement section for moving the light beam in a substantially radial direction of the information carrier;
- a coarse movement section for moving the fine movement section in the substantially radial direction of the information carrier;
- a tracking controller for controlling the fine movement section and the coarse movement section based on the tracking error signal detected by the tracking error detector so that the light beam is positioned along the track; said tracking controller comprising a switch for inactivating a control of the coarse movement section; and
- an eccentricity detector for detecting an amount of eccentricity of the track on the information carrier while inactivating the control of the coarse movement section by the switch during an operation of the tracking controller, wherein
  the tracking controller controls the coarse movement section based on the amount of eccentricity detected by the eccentricity detector.

14. An optical disk apparatus for irradiating a track on an information carrier on which information is recorded with a light beam so as to reproduce information from the track, the optical disk comprising:
- a tracking error detector for detecting a tracking error signal representing a displacement between the light beam and the track;
- a fine movement section for moving the light beam in a substantially radial direction of the information carrier;
- a coarse movement section for moving the fine movement section in the substantially radial direction of the information carrier;
- a tracking controller for controlling the fine movement section and the coarse movement section based on the tracking error signal detected by the tracking error detector so that the light beam is positioned along the track; said tracking controller comprising:
  (a) a fine tracking controller comprising a tracking linear filter for outputting a control signal for controlling the fine movement section based on the tracking error signal so that the light beam is positioned along the track; and
  (b) a coarse tracking controller for controlling the coarse movement section so that an amount of movement of the fine movement section by the fine tracking controller is zero on average; and
- an eccentricity detector for detecting the amount of eccentricity of the track on the information carrier based on an amplitude of an alternating current component of the control signal which is output from the tracking linear filter, wherein
  the tracking controller controls the coarse movement section based on the amount of eccentricity detected by the eccentricity detector.

15. An optical disk apparatus for irradiating a track on an information carrier on which information is recorded with a light beam so as to reproduce information from the track, the optical disk comprising:
- a tracking error detector for detecting a tracking error signal representing a displacement between the light beam and the track;
- a fine movement section for moving the light beam in a substantially radial direction of the information carrier;
- a coarse movement section for moving the fine movement section in the substantially radial direction of the information carrier;
- a tracking controller for controlling the fine movement section and the coarse movement section based on the tracking error signal detected by the tracking error detector so that the light beam is positioned along the track; said tracking controller comprising:
  (a) a fine tracking controller comprising a tracking linear filter for outputting a control signal for controlling the fine movement section based on the tracking error signal so that the light beam is positioned along the track; and
  (b) a coarse tracking controller for controlling the coarse movement section so that an amount of movement of the fine movement section by the fine tracking controller is zero on average, and
- an eccentricity detector for detecting an amount of eccentricity of the track on the information carrier, wherein
  the tracking controller controls the coarse movement section based on the amount of eccentricity detected by the eccentricity detector.

16. An optical disk apparatus for irradiating a track on an information carrier on which information is recorded with a light beam so as to reproduce information from the track, the optical disk comprising:

a tracking error detector for detecting a tracking error signal representing a displacement between the light beam and the track;

a fine movement section for moving the light beam in a substantially radial direction of the information carrier;

a coarse movement section for moving the fine movement section in the substantially radial direction of the information carrier;

a tracking controller for controlling the fine movement section and the coarse movement section based on the tracking error signal detected by the tracking error detector so that the light beam is positioned along the track; and an eccentricity detector for detecting an amount of eccentricity of the track on the information carrier, said eccentricity detector comprising a dead zone width calculator for calculating a dead zone width representing a range in which a value of a drive signal for driving the coarse movement section is substantially zero, based on the amount of eccentricity, wherein the tracking controller controls the coarse movement section based on the amount of eccentricity detected by the eccentricity detector based on the dead zone width calculated by the dead zone calculator.

* * * * *